(12) United States Patent
Chari et al.

(10) Patent No.: US 7,697,504 B2
(45) Date of Patent: Apr. 13, 2010

(54) MESH NETWORK THAT INCLUDES FIXED AND MOBILE ACCESS NODES

(75) Inventors: Amalavoyal Chari, Sunnyvale, CA (US); Devabhaktuni Srikrishna, Sunnyvale, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 664 days.

(21) Appl. No.: 11/334,601

(22) Filed: Jan. 18, 2006

(65) Prior Publication Data

US 2006/0114881 A1 Jun. 1, 2006

Related U.S. Application Data

(63) Continuation-in-part of application No. 10/693,721, filed on Oct. 25, 2003, now Pat. No. 7,397,789, which is a continuation of application No. 09/751,262, filed on Dec. 29, 2000, now Pat. No. 6,704,301.

(51) Int. Cl.
*H04L 12/28* (2006.01)
*H04L 12/56* (2006.01)
(52) U.S. Cl. .................................. 370/351; 370/401
(58) Field of Classification Search .................. None
See application file for complete search history.

(56) References Cited

U.S. PATENT DOCUMENTS

| | | | |
|---|---|---|---|
| 5,471,469 A | 11/1995 | Flammer, III et al. | |
| 5,572,528 A * | 11/1996 | Shuen | 370/402 |
| 6,044,062 A | 3/2000 | Brownrigg et al. | |
| 6,097,703 A | 8/2000 | Larsen et al. | |
| 6,249,516 B1 | 6/2001 | Brownrigg et al. | |
| 6,493,377 B2 | 12/2002 | Schilling et al. | |
| 6,879,574 B2 | 4/2005 | Naghian et al. | |
| 7,181,214 B1 * | 2/2007 | White | 455/435.1 |
| 2002/0191573 A1 * | 12/2002 | Whitehill et al. | 370/338 |
| 2004/0017794 A1 * | 1/2004 | Trachewsky | 370/338 |
| 2004/0022223 A1 * | 2/2004 | Billhartz | 370/338 |
| 2004/0066759 A1 * | 4/2004 | Molteni et al. | 370/329 |
| 2004/0171347 A1 | 9/2004 | Burton et al. | |
| 2004/0176024 A1 * | 9/2004 | Hsu et al. | 455/3.04 |
| 2004/0203787 A1 | 10/2004 | Naghian | |
| 2004/0246935 A1 * | 12/2004 | Joshi et al. | 370/338 |
| 2004/0252643 A1 * | 12/2004 | Joshi | 370/238 |
| 2005/0036616 A1 * | 2/2005 | Huang et al. | 380/255 |
| 2005/0041627 A1 * | 2/2005 | Duggi | 370/338 |
| 2007/0258508 A1 * | 11/2007 | Werb et al. | 375/140 |

* cited by examiner

*Primary Examiner*—Gregory B Sefcheck
*Assistant Examiner*—Suk Jin Kang
(74) *Attorney, Agent, or Firm*—Brian R. Short (57) ABSTRACT

An apparatus and method of selecting a routing path through a mesh network that includes a mobile access node is disclosed. The method includes each access node of the mesh network capable of receiving routing beacons from at least one upstream access node. The routing beacons including information of all upstream access nodes along a path to a gateway access node. The mobile access node selecting a route through an upstream access node based upon a quality of beacons received from at least one upstream access node, and whether the at least one upstream access node is a fixed access node or another mobile access node.

24 Claims, 6 Drawing Sheets

Each access node of the mesh network receiving routing beacons from at least one upstream access node, the routing beacons including information of upstream access nodes along a path to a gateway access node

610

The mobile access node selecting a route through an upstream access node based upon a quality of beacons received from at least one upstream access node, and whether the at least one upstream access node is a fixed access node or another mobile access node

MESH NETWORK THAT INCLUDES FIXED AND MOBILE ACCESS NODES

RELATED PATENT APPLICATIONS

This patent application is a continuation-in-part of patent application Ser. No. 10/693,721 filed on Oct. 25, 2003, now U.S. Pat. No. 7,397,789, which is a continuation of patent application Ser. No. 09/751,262 filed on Dec. 29, 2000, and issued as U.S. Pat. No. 6,704,301, which is herein incorporated by reference.

FIELD OF THE INVENTION

The invention relates generally to wireless communications. More particularly, the invention relates to a method and apparatus of a mesh network that includes fixed and mobile access nodes.

BACKGROUND OF THE INVENTION

Packet networking is a form of data communication in which data packets are routed from a source device to a destination device. Packets can be networked directly between a source node and a destination node, or the packets can be relayed through a number of intermediate nodes.

A wireless network can include a wireless device being connected to a network through a base station that is wired to the network. The wireless device can transmit data packets that are received by the base station and then routed through the network. The wireless network can include many base stations that are each wired to the network.

Figure 1:
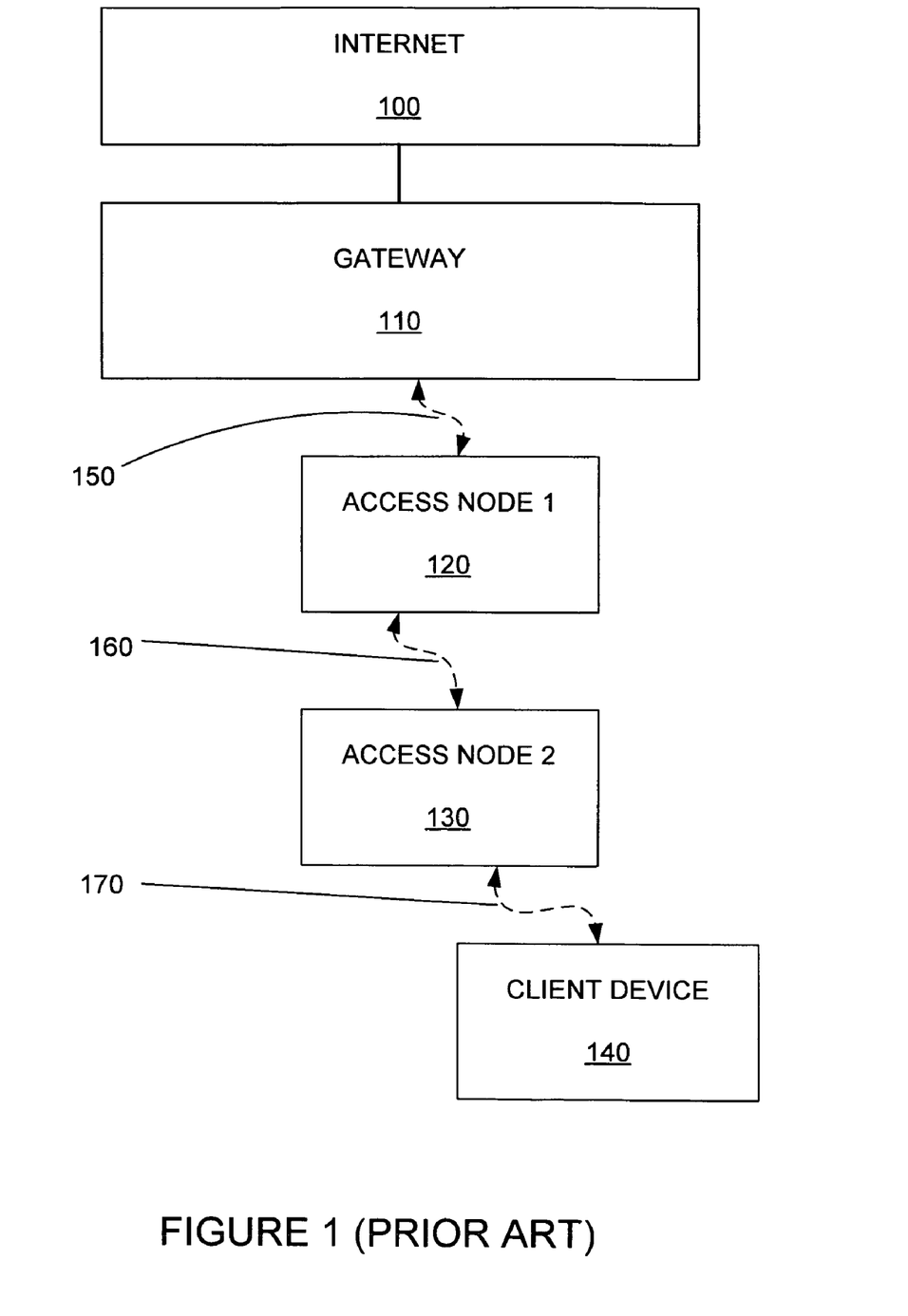
FIG. 1 shows a prior art mesh network.

FIG. 1 shows a prior art mesh network that includes a gateway 110 connecting a client device 140 to a network (internet) 100 through fixed access nodes 120, 130. The connections between the gateway 110 and the access nodes 120, 130 can be wireless. Additionally, the connection between the access nodes 120, 130 and the client 140 can be wireless. Wireless connections typically are subject to conditions that can make the connections unreliable. Such conditions include fading, multi-path and signal interference. Additionally, the client 140 can roam. Therefore, the optimal routing conditions between the client 140 and the gateway 110 can vary, requiring the routing to be updated over time. Roaming of the client 140 typically requires the client 140 to include specialized software or hardware.

Some mesh networks can additionally include mobile access nodes. Mobile access nodes add another layer of complexity because optimal routes continually change for access nodes that are mobile.

It is desirable to have a wireless mesh network that includes fixed and mobile access nodes, that continually analyzes the quality of routing paths through the wireless mesh network, and selects an optimal path from among all available routing paths. It is additionally desirable that clients be able to roam between access nodes without being required to include specialized hardware and/or software.

SUMMARY OF THE INVENTION

The invention includes an apparatus and method for analyzing a quality of routing paths of a wireless network that includes fixed access nodes and mobile access nodes, and selecting an optimal path from among all available routing paths.

An embodiment includes a method of selecting a routing path through a mesh network that includes a mobile access node. The method includes each access node of the mesh network capable of receiving routing beacons from at least one upstream access node. The routing beacons include information (which can include addresses) of all upstream access nodes along a path to a gateway access node. The mobile access node selects a route through an upstream access node based upon a quality of beacons received from at least one upstream access node, and whether the at least one, upstream access node is a fixed access node or another mobile access node.

Other aspects and advantages of the present invention will become apparent from the following detailed description, taken in conjunction with the accompanying drawings, illustrating by way of example the principles of the invention.

DETAILED DESCRIPTION

As shown in the drawings for purposes of illustration, the invention is embodied in an apparatus and method for analyzing a quality of routing paths of a wireless network that includes fixed access nodes and mobile access nodes, and selecting an optimal path from among all available routing paths.

Fixed access nodes are typically mounted on streetlights, utility poles, cable strands and the like. An embodiment of mobile access nodes are designed to be mounted inside an automobile, typically in the trunk, and drawing power from the battery of the automobile. Fixed access nodes can connect together wirelessly to form a mesh network that provides coverage to wireless client devices such as laptops or PDAs equipped with wireless radios. A fraction of the fixed access nodes can have provisioned backhaul over fiber or Ethernet or WiMax or other point-to-point or point-to-multipoint wireless backhaul. Mobile access nodes can be used to extend the coverage area afforded by the fixed access nodes. In addition, mobile access nodes can also provide network connectivity to client devices which are either wireless-enabled or are directly plugged into an Ethernet port on the mobile access node. Mobile access nodes can connect wirelessly to the mesh network and join it through fixed or mobile access nodes.

Figure 2:
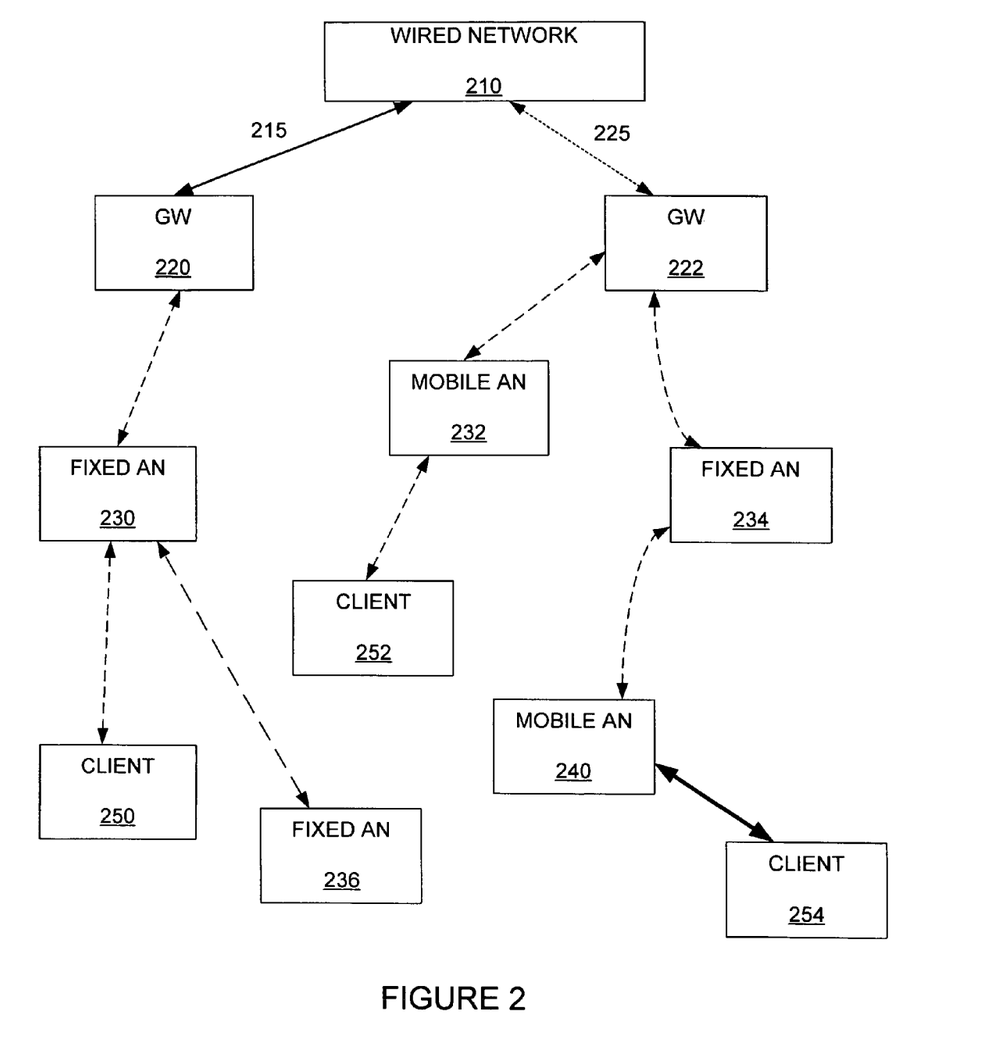
FIG. 2 shows a wireless network that includes fixed access nodes and mobile access node.

FIG. 2 shows a wireless network that includes fixed access nodes and mobile access node. The wireless network includes gateways 220, 222. The gateways 220, 22 are connected to a wired network 210, such as the internet. The gateways 220, 222 can be either wired or wirelessly connected to the wired network 210.

The network further includes access nodes 230, 232, 234, 236, 240. The access nodes can include fixed access nodes 230, 234, 236 or mobile access nodes 232, 240. The fixed access nodes 230, 234, 236 remain in a relatively stable location with respect to the rest of the network. The mobile access nodes 232, 240 can move their locations with respect to the rest of the network.

Clients 250, 252, 254 can be wired or wirelessly connected to the access nodes 230, 232, 234, 236, 240. A shown in FIG. 2, a first client 250 is wirelessly connected to the fixed access node 230, a second client 252 is wirelessly connected to the mobile access node 232, and a third client 254 is wired connected to the mobile access node 240.

Allowing mobile access nodes to move relative to the rest of the mesh network requires the mesh network to be dynamic. The routing selections between gateways and clients should be continually monitored and reselected. Additionally, mobile access nodes and clients should be able to move within the network without the clients being required to carry special hardware or software.

Figure 3:
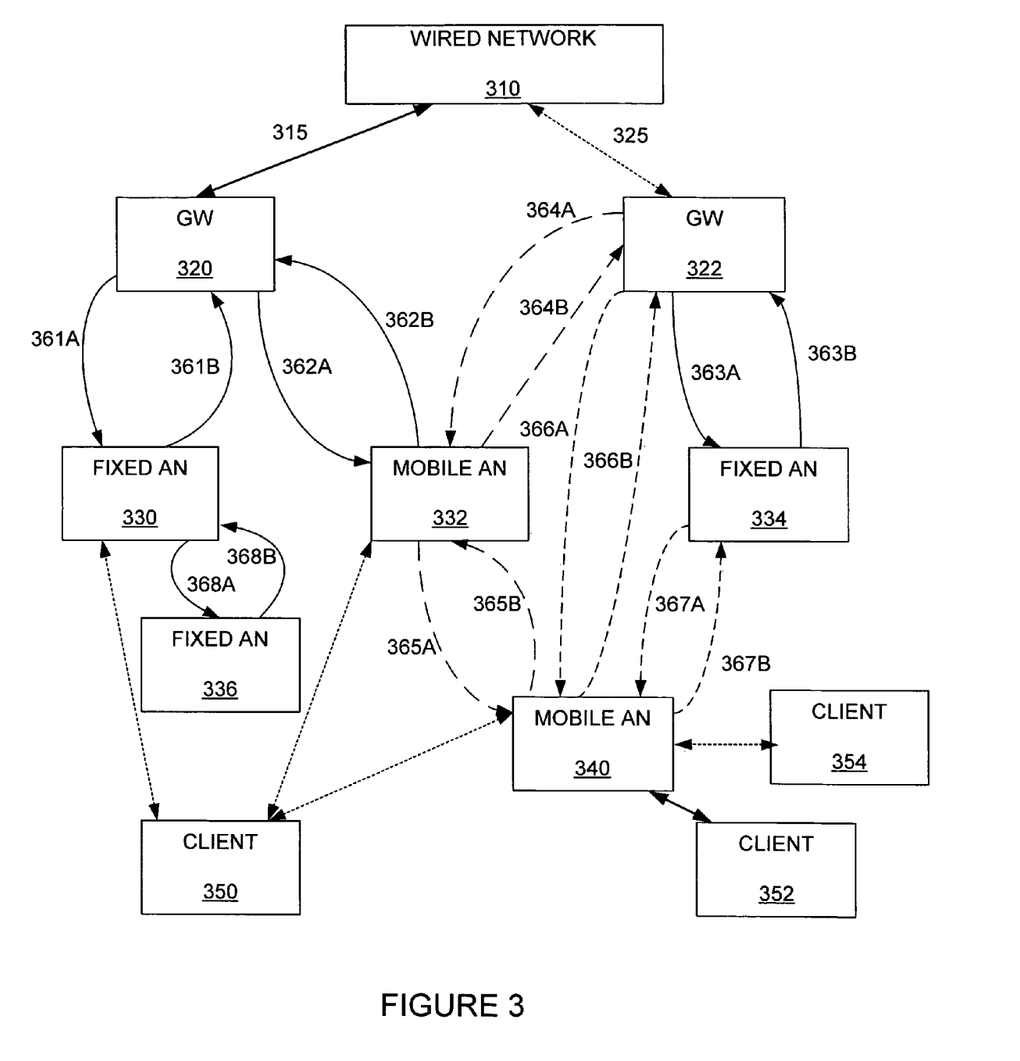
FIG. 3 shows a wireless network that includes possible routing selections that can be made between clients and gateways.

FIG. 3 shows a wireless network that includes possible routing selections that can be made between clients and gateways. The wireless network includes gateways 320,322 which are coupled to the wired network 310. The gateways 320, 322 typically include high bandwidth connections 315 to the wired network 310 which can be wired or wireless. A gateway is an access node that can originate routing beacons, as will be described.

Routing Selections

Access nodes 330, 332, 334, 336, 340 (both fixed access nodes and mobile access nodes) are coupled either directly or indirectly to the gateways 320, 322. That is, each access node is either directly connected to an upstream gateway 320, 322, or indirectly connected through another access node to at least one of the upstream gateways 320, 322. Many factors can be included in the decision of which access nodes or gateways each access node is connected. The network of FIG. 3 can include any number of additional gateways and access nodes. As shown in FIG. 3, a client 350 can obtain access to the network by establishing a connection to an available access node, such as, any of access nodes 330, 332, 340.

Gateways 320, 322 broadcast routing packets (beacons), which can be used to determine routing between access nodes 330-340 and gateways 320, 322 of the network. The beacons are received by all first-level access nodes (for example, fixed and mobile access nodes 330, 332, 334), which are access nodes that are able to receive gateway transmitted beacons, and directly route data through to a gateway.

The beacons are used to establish a route from each access node to a gateway. The first level access nodes re-broadcast the beacon data, attaching their own information to the beacon. The information indicates to the second level access nodes that the path to the gateway includes the first level access node. The first level access nodes re-broadcast the beacons, after adding first level access node information, such as the address of the first level access node. First level access nodes can be fixed access nodes or mobile access nodes.

As previously described, the beacons are used to establish a route from each access node to a gateway. The first level access nodes re-broadcast the beacon data, attaching their own information to the beacon. The information indicates to the second level access nodes that the path to the gateway includes the first level access node. As each access node rebroadcasts the beacons, each access node adds additional information. The rebroadcast information can include the addresses of all upstream access nodes along the path to the gateway access node. That is, an embodiment includes each access node that receives routing beacons, modifying the routing beacons of a selected route by attaching an address of the access node, and re-broadcasting the modified beacons.

For one embodiment, the link quality of the beacon received determines whether that beacon is rebroadcast by the access node. If the quality of the beacon is above a determined threshold, it is rebroadcast. Another embodiment includes each access node only re-broadcasting beacons received from its currently-chosen default gateway. The beacons can be used to determine the quality of the link in both an upstream (towards a gateway) direction, and in a downstream (away from a gateway) direction. The upstream and the downstream link qualities can be used by each access node to select the best data routing path to a gateway. The link qualities can be influenced by other wireless transmission factors such as interference, noise and fading. Typically, the link qualities vary more for mobile access nodes than for fixed access nodes. The link qualities can be determined be calculating the percentage of beacons that are transmitted and successfully received. The link qualities can alternatively be determined by measuring a PER, BER or SNR of received routing beacons.

The first level access nodes 330, 332, 334 include upstream links, and downstream links to the gateways 320, 322. As shown in FIG. 3, fixed access node 330 includes a downstream link 361A and an upstream link 361B with the gateway 320, mobile access node 332 includes a downstream link 362A and an upstream link 362B with the gateway 320, and fixed access node 334 includes a downstream link 363A and an upstream link 363B with the gateway 322. The quality of a downstream link can be different than the quality of the corresponding upstream link. For example, the quality of the downstream link 361A can be different than the quality of the upstream link 361B, the quality of the downstream link 362A can be different than the quality of the upstream link 362B, and the quality of the downstream link 363A can be different than the quality of the upstream link 363B. Link asymmetries can arise because of differences in transmit power levels at each end of the link, or due to environmental effects or signal interference.

The asymmetrical characteristics of the links between access nodes (fixed and mobile) and the gateways can lead to non-optimal routing selections if, for example, the quality of the upstream links is not included in routing decisions by access nodes (fixed and mobile) to gateways. Each gateway and access node transmits beacons. All access nodes and gateways that receive the beacons can make an estimate of the quality of the link based upon the reception of the beacons. The estimates can include both upstream link quality and downstream link quality. Once each access node has the upstream and downstream link qualities within every possible data path to a gateway, the access node can make a selection of the best available data path.

As shown in FIG. 3, the first level mobile access node 332 routes data through the gateway 320. However, the mobile access node 332 could have selected the gateway 322 to route data. A possible link between the mobile access node 332 and the gateway 322 includes the downlink 364A and the uplink 364B. The mobile access node 332 selects the gateway to route data by selecting the best combination of uplinks and downlinks. What is the best combination can depend upon the type of data being routed to and from the gateway. If the mobile access node 332 determines that the downlink 364A/uplink 364B combination of the gateway 322 is better than the downlink 362A/uplink 362B combination of the gateway 320, then the mobile access node 332 can select to route date through the gateway 322.

Each access node has at least one upstream node, and may have a plurality of downstream nodes. Upstream nodes are the nodes that are between the access node and the gateway. For a level one access node, there is only one upstream node, the gateway. For a level four access node, there are four upstream nodes, which define the access node's path to the gateway. Downstream nodes are nodes that receive the beacon from a particular access node, and define their path to the gateway through that access node.

FIG. 3 also includes a second level mobile access node 340. As shown, the mobile access node 340 can select a data path through mobile access node 332 (through downlink 365A and an uplink 365B), through fixed access node 334 (through downlink 367A and an uplink 367B), or through gateway 322 (through downlink 366A and uplink 366B). The mobile access node 340 makes a data path routing selection based upon the best quality combination of the links (downstream and upstream) and whether the upstream node broadcasting the received beacon is a fixed access node or mobile access node.

Beacon Selection—Fixed Access Node versus Mobile Access Node

Routing selections can be dependent upon whether the upstream access node is a fixed access node or a mobile access node. In one embodiment, the route selection protocol on a fixed access node can limit the fixed access node to only select a route through an upstream fixed access node, rather than through an upstream mobile access node. In another embodiment, the route selection protocol on a fixed access node can include a preference for routes through an upstream fixed access node, with a route through an upstream mobile access node only being chosen if it has a path quality that is better than any route through a fixed access node by at least a predefined margin. This behavior is desirable because routes through mobile access nodes can be inherently unstable because of the mobility of the mobile access nodes and less preferable than routes through fixed access nodes. Additionally, mobile nodes can be allowed to select routes that include both mobile access nodes and fixed access nodes upstream. Additionally, a mobile access node's routing protocol can include a preference for paths through a fixed access node as the next hop upstream router as opposed to choosing a path through an upstream mobile access node. Other routing selection protocols allow fixed access nodes to route through both upstream fixed access nodes and mobile access nodes.

Figure 4:
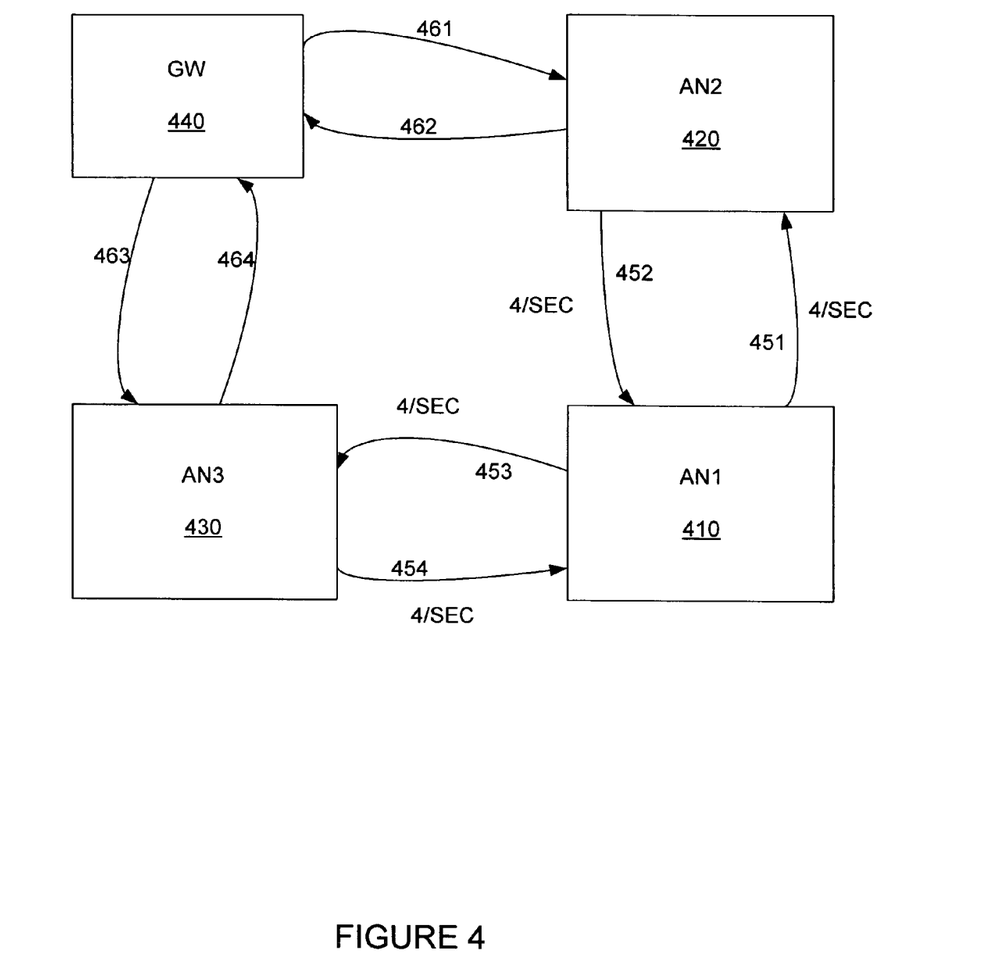
FIG. 4 shows another wireless network which shows uplinks and downlinks that can influence the routing selections.

FIG. 4 is another wireless network which shows uplinks and downlinks that can influence the routing selections. An embodiment includes the access node (fixed or mobile) 410 transmitting a predetermined number of routing packets per unit of time. For example, FIG. 4 indicates that 4 routing packets are transmitted per second. A second access node (fixed or mobile) 420 receives the first routing packets and determines a quality of the first direction 451 of the first link. The quality of the first direction 451 of the first link can be determined, for example, by calculating the percentage of first routing packets that are successfully received by the second access node 420. If, for example, 3 routing packets per second are received by the second access node 420, the second access node can determine the quality of the first direction 451 of the first link to be 75%.

The second routing packets can be received by the first access node 410 over a second direction 452 of the first link. Again, the second access node 420 can transmit a predetermined number of routing packets per unit of time. For example, FIG. 4 indicates that 4 routing packets are transmitted per second. The second routing packets can be transmitted to include the quality of the first direction 451 of the first link. The first access node receives at least one of the second routing packets over a second direction of the first link, and determines a first direction link quality of the first link based upon the second routing packets. The first access node can also determine a second direction link quality of the first link based upon the second routing packets by calculating the percentage of successfully received second routing packets.

If the access nodes 410, 420 are within a mesh network as shown in FIG. 2, an embodiment includes the first access node being downstream from the second access node, and the first access node making a routing decision to a gateway (such as gateway 440) based upon the second routing packets. More specifically, the routing decision can be based upon information within the second routing packets (for example, first direction link quality), and/or the routing decision can be based upon a quality of the received second routing packets (for example, the percentage of second routing packets received or second routing packet SNR).

An embodiment includes the first access node 410 being downstream from the second access node 420, and the first access node 410 making a routing decision to a gateway 440 based at least partially upon the first direction link quality of the first link and the second direction link quality of the first link. As stated earlier, the first direction link quality can be determined by determining a percentage of routing packets per unit of time received by the second access node 420, and the second direction link quality can be determined by determining a percentage of second routing packets per unit of time received by the first access node 410.

The mesh network can additionally include a third access node (fixed or mobile) 430 receiving at least one of the first routing packets over a first direction 453 of a second link from the first access node 410. The third access node 410 can also transmit third routing packets. An embodiment includes the first access node receiving at least one of the third routing packets over a second direction 454 of the second link, and determining a first direction link quality of the second link based upon the third routing packets.

Having received the second routing packets and the third routing packets, the first access node 410 can select a route through at least one of the second node and the third node at least partially based upon the first direction link quality of the first direction of the first link and the first direction link quality of the first direction of the second link.

The mesh network can further include a gateway 440 which the second access node 420 and third access node 430 can be connected. The connections include downstream links 461, 463 and upstream links 462, 464. As will be described, the further upstream links can be used for data path selections to the gateways. Eventually, routing packets transmitted by all access nodes within the mesh network include information about all neighboring access nodes. This information typically includes forward and reverse link qualities of all neighboring access nodes. A neighboring access node is one which can receive routing packets directly (without being delayed) or that can transmit routing packets directly (without being delayed) to the access node.

The routing packets can be designated as beacons, and include routing information. The beacons can be transmitted according to an 802.11 protocol. Any of the access nodes are operable as gateways as well.

ESSID(s)

According to the 802.11 protocol, access nodes can advertise or support associations on one or more ESSIDs (extended service set identifications). Client devices or 802.11 Stations may associate to any of the ESSIDs supported on the access node. Since the mobile access node infrastructure is different from the fixed access node infrastructure, it is desirable for the mobile access nodes to advertise or support a different set of ESSIDs than the fixed access nodes. In this way, client devices that are configured with access profiles matching the mobile access nodes can preferentially associate with mobile access nodes. Conversely, client devices that are configured with access profiles matching the fixed access nodes can preferentially associate with fixed access nodes. An exemplary embodiment of the mobile access nodes are configured to send 802.11 beacons advertising a distinct set of ESSIDs from the fixed access nodes. Furthermore, mobile access nodes can be configured to respond to 802.11 probe requests and 802.11 association requests on a distinct set of ESSIDs from the fixed access nodes.

Mobile access nodes cab select routing paths based on the routing protocol. These routing paths can be used to establish a communications path for client devices that are connected to the mobile access node whether wirelessly or through a wired Ethernet connection through an Ethernet port on the mobile access node. Client devices may run connection-management software modules such as NetMotion or PadCom to manage network connectivity and enable handoffs between disparate wireless access networks such as Wi-Fi, 3G, GPRS, cellular networks, etc.

In the event that no routing path exists that is better than a predetermined threshold, the mobile access node can switch off its wired Ethernet port as a means of terminating the wired connection to the client device. This can enable the client device to be informed of the unavailability of the connection over the wireless mesh network and allow any connection-management software on the client device to search for alternate connections over other access networks such as, for example, GPRS or cellular networks.

In the event that no routing path exists that is better than a predetermined threshold, the mobile access node can additionally stop responding to 802.11 probe requests, and 802.11 association requests on its configured set of ESSIDs stop generating 802.11 beacons on its configured set of ESSIDS, and force wirelessly-associated clients to disassociate as a means of terminating wireless connections to client devices. This can enable the wireless client devices to be informed of the unavailability of the connection over the wireless mesh network and allow any connection-management software on the client devices to search for alternate connections over other access networks such as GPRS or cellular networks.

In such a case, where a mobile access node has no available routing path that has a quality above a predetermined threshold, and terminates connectivity to clients, it is desirable to still have a means for a network operator to be able to access the mobile access node in order to effect configuration changes. To enable this, an embodiment of the wireless mesh network includes a means for the mobile access node to accept 802.11 probe requests and 802.11 association requests on a separate, pre-configured, ESSID designated as the "stand-alone" ESSID. No 802.11 beacons are generated on this ESSID, so only operator-managed devices that are pre-configured with an access profile corresponding to this ESSID are aware of or able to associate to this ESSID. This ESSID, in effect, provides a backdoor to gain operator access to the mobile access node in the event of the mobile access node being cut off from network connectivity for any of a variety of reasons, including having roamed outside the coverage area of the wireless mesh network. This additionally provides a means of recovery in the event of mis-configuration of the mobile access node.

Fixed Access Node and Mobile Access Node Configurations

Mobile access nodes are generally engineered to be mounted inside automotive vehicles and draw power from the battery of the vehicle. They are also engineered to meet environmental and thermal specifications relevant to the automotive environments. By contrast, fixed access nodes are typically engineered to be mounted on streetlights, utility poles, cable strands and the like and to accept a wide variety of AC and DC voltages. They are typically engineered to meet a different set of environmental specifications including different thermal requirements, wind-loading, lightning- and surge-protection, etc. However, it is desirable to be able to take an access node engineered to fixed access node specifications and configure its software to operate as a mobile access node. In accordance with the present invention, a fixed access node can be configured to operate as a mobile access node. Conversely, it is desirable to be able to take an access node engineered to mobile access node specifications and configure its software to operate as a fixed access node. An exemplary embodiment of the mobile access node can be configured to operate as a fixed access node. This is useful in situations where it is desirable to use a car-mountable mobile access node to verify connectivity and evaluate the impact to coverage of introducing a fixed access node at a particular location without having to undertake the work of sending a bucket-truck operator to the location to mount a fixed access node on a streetlight.

Roaming Between Access Nodes

Figure 5:
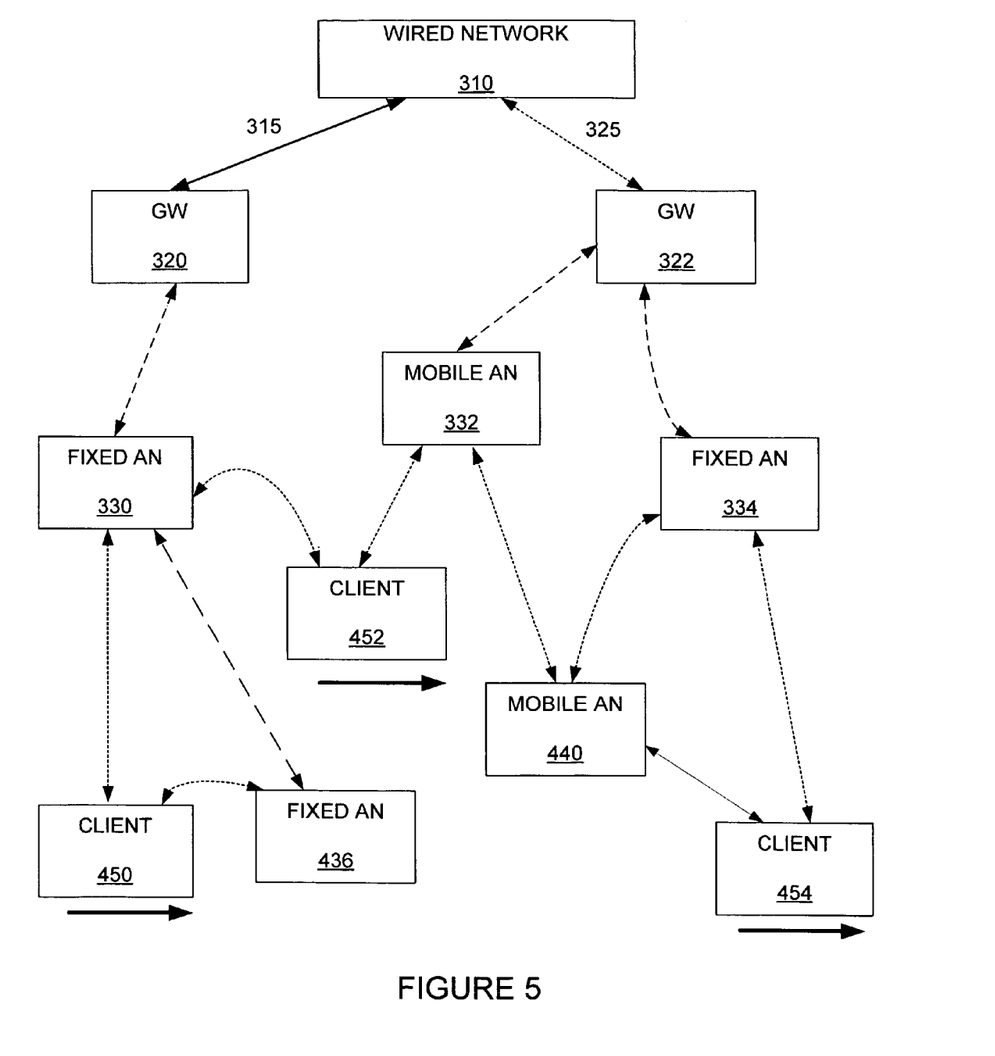
FIG. 5 shows various roaming conditions including roaming mobile access nodes and roaming clients.

FIG. 5 shows various roaming scenarios within a wireless mesh network. For example, FIG. 5 shows a client 450 roaming from a fixed access node 330 to another fixed access node 436, a client 452 roaming from a fixed access node 330 to a mobile access node 332, a client 454 roaming from a mobile access node 440 to a fixed access node 334.

A client roaming from a first access node (fixed or mobile) to a second access node (fixed or mobile) includes the first access node initially detecting the client seeking access to the system or network, and the second access node subsequently detecting the client. The first wireless access node is generally wirelessly connectable to a back bone network. The first wireless access node obtains information about the client. The first wireless node provides the client with a communication path to and from a destination. The communication path can include wired and wireless communication links, and the first access node aids in a routing of information through the communication path between the client and the destination based upon detection of the client. A client connected to the first access node can roam to a second access node. The second wireless access node allows the client to maintain a same default gateway IP address as the client roams from the first access node to the second access node.

When the client roams to the second access node, the second access node detects the client. Detecting the client includes detecting a MAC address of the client, and determining an IP address of the client. Detecting the client can include receiving an association request from the client, and determining client information parameters. The determination of client information parameters includes determining an IP address of client's default gateway, determining a length of a DHCP lease, determining a time the client was last on the network, and/or determining an IP address of the client.

An embodiment of the access nodes includes the first access node referencing at least one of a first gateway within a same cluster as the first access node, or a third gateway, to obtain client information regarding the client. If a first requested gateway does not have the client information, then the first requested gateway requests the client information from another gateway.

The first access node can obtain the client information from a gateway by sending an anti-ARP request, as will be described.

Detection of a Client

Generally, detecting the client includes detecting a MAC address of the client, and determining an IP address of the client. When a client device is attached to an access node of a network, the MAC address of the client device can be detected. Several different methods can be used to detect the MAC address.

Some Medium Access Control (MAC) protocols include receiving an association request from the client. An embodiment of the invention includes an 802.11b protocol that creates an association between a client device and the corresponding access node. At any given point of time, a client device can only be associated to a single access node. The list of client devices attached to an access node can usually be obtained by querying a network interface card driver within the access node. This method only applies to MAC protocols, such as 802.11b, that create associations between client devices and access nodes and would, for instance, not apply in the case of an Ethernet MAC.

Another embodiment of the invention includes inspection of frames originating from the client device. The frames can include the client device's MAC address as the source MAC address. Inspection of these frames at the access node allows the access node to determine the client device's MAC address. Inspection of each incoming frame at the access node incurs considerable network processing overhead even if there are no new client devices attaching to the downlink interface. Therefore, this method can be inefficient. This method can be made more efficient by only inspecting frames with source MAC addresses not matching a list of known source MAC addresses corresponding to attached client devices that have already been detected. This method of detection can fail if the client device does not generate any traffic.

Another embodiment of the invention includes the access node pinging a broadcast address. More specifically, the access node can periodically ping the broadcast address (255.255.255.255) and inspect the ping responses to determine the MAC and IP addresses of any client devices attached to the downlink interface. TCP/IP stacks of some operating systems do not respond to broadcast pings, and this method may not be reliable.

Another embodiment of the invention includes an attached client device generating ARP requests for hosts on its subnet. These ARP requests can result in the generation of ARP cache entries for the client device on the access node to which the client device is attached. Through an examination of the ARP cache, the access node can determine the MAC addresses (and corresponding IP addresses) of attached client devices. This method has the disadvantage that ARP cache entries on the access nodes are generated only in response to ARP requests from the client device and these are issued only when the client device's ARP cache expires. On many client device operating systems, the ARP cache expiration time can be as long as 20 minutes.

Once the MAC address of the client has been determined, generally the IP address of the client must be determined. Several different methods can be used to detect the client IP address.

One or more servers (gateways) on the network can maintain a MAC-address-to-IP-address mapping for all client devices attached to the network. The address mapping can be stored in an address mapping table that can be arranged to be synchronized across all the servers. This address mapping table can be referred to as an AARP Table (AARP=Anti-ARP). ARP is generally is a protocol for the resolution of IP addresses to MAC addresses. Here, anti-ARP (AARP) is a protocol for the resolution of MAC addresses to IP addresses An access node can query one of these servers (gateways) to determine the IP address corresponding to the MAC address of one of the Client Devices attached (in communication) to the access node. Generally, the gateway (server) responds with the IP address of the client device (if this entry exists in its AARP Table). If the entry does not exist in the AARP table, the gateway queries other gateways. The gateway generally then responds to the access node with the reply received.

Generally, the access node functions as an AARP Client. A Gateway acts as an AARP Server when responding to AARP Requests from an Access Node or a Gateway and as an AARP Client when sending AARP Requests to another Gateway. The service requested is the determination of the IP address corresponding to a given MAC address. Therefore, the service request is termed AARP (Anti-ARP), as opposed to ARP which is a protocol for the resolution of IP addresses to MAC addresses.

Figure 6:
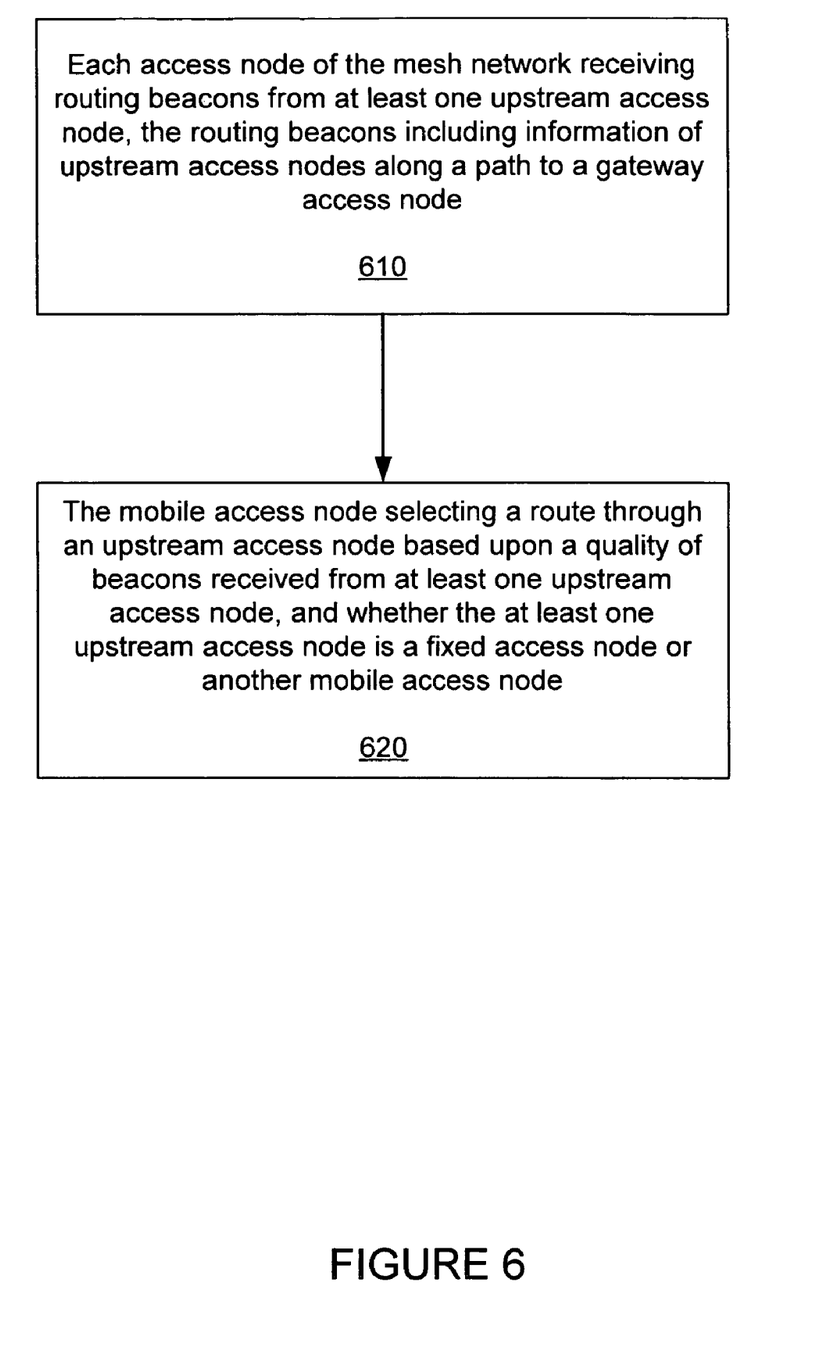
FIG. 6 is a flow chart showing acts according to another embodiment of the invention.

FIG. 6 is a flow chart showing an exemplary method of selecting routing paths by an access node within a wireless mesh network that include mobile and fixed access nodes. A first step 610 includes each access node of the mesh network receiving routing beacons from at least one upstream access node, the routing beacons including information of upstream access nodes along a path to a gateway access node. A second step 620 includes the mobile access node selecting a route through an upstream access node based upon a quality of beacons received from at least one upstream access node, and whether the at least one upstream access node is a fixed access node or another mobile access node.

Although specific embodiments of the invention have been described and illustrated, the invention is not to be limited to the specific forms or arrangements of parts so described and illustrated. The invention is limited only by the appended claims.

What is claimed:

1. A method of selecting a routing path through a mesh network that includes a mobile access node, comprising:
   each access node of the mesh network capable of receiving routing beacons from at least one upstream access node, the routing beacons including information of upstream access nodes along a path to a gateway access node, wherein the routing beacons originate at the gateway access node at a predetermined rate;
   the mobile access node selecting a route through an upstream access node based upon;
   a) a quality of routing beacons received from at least one upstream access node, and
   b) whether the at least one upstream access node is a fixed access node or another mobile access node;
   wherein the quality of routing beacons is determined by a percentage of routing packets per unit of time transmitted from the upstream access node that are received from the upstream access node; and
   further comprising each access node that receives routing beacons, modifying the routing beacons of a selected route by attaching an address of the access node, and re-broadcasting the modified routing beacons, wherein the routing beacons include addresses of all access nodes included in a selected routing path to the originating gateway.

2. The method of claim 1, wherein the routing beacons originate at gateway access nodes.

3. The method of claim 1, wherein the quality of beacons is additionally determined by at least one of a signal to noise ratio (SNR) of the beacons received by the access node, or a packet error rate (PER) of beacons received by the access node.

4. The method of claim 1, further comprising the mobile access node determining a reverse link quality between the mobile access node and the at least one upstream access node.

5. The method of claim 4, wherein the route selection by the mobile access node is additionally based upon the reverse link quality between the mobile access node and the at least one upstream access node.

6. The method of claim 1, further comprising fixed access nodes of the mesh network selecting a route through an upstream node if the upstream node is a fixed access node, and based upon a quality of the beacons received from the upstream fixed access node.

7. The method of claim 6, further comprising the fixed access nodes selecting the route based upon a reverse link quality between the fixed access node and the upstream access node.

8. The method of claim 1, wherein the mobile access node selects a mobile access node as an upstream access node if the mobile node does not receive beacons from an upstream fixed node having a quality above a threshold.

9. The method of claim 1, wherein mobile access nodes advertise an extended service set identification (ESSID) that is different from any ESSID that is advertised by any fixed access nodes.

10. The method of claim 1, further comprising the mobile access node switching off an Ethernet wired interface if a routing path to any one of available gateway access nodes having a quality greater than a threshold is not available to the mobile access node.

11. The method of claim 1, wherein if a routing path to the gateway access node having a quality greater than a threshold is not available to the mobile access node, the mobile access node ceases advertising of a configured set of ESSIDs and stops accepting associations on the configured ESSIDs.

12. The method of claim 6, wherein if one of the fixed access nodes cannot select a routing path to the gateway access node having a quality greater than a threshold, the fixed access node ceases advertising of a configured set of ESSIDs and stops accepting associations on the configured ESSIDs.

13. The method of claim 1, wherein if the mobile access node cannot select a routing path to the gateway access node having a quality greater than a threshold, the mobile access node starts advertising a "standalone" SSID to aid in recovery.

14. The method of claim 1, wherein fixed access nodes can be configured to operate as mobile access nodes.

15. The method of claim 1, wherein mobile access nodes can be configured to operate as fixed access nodes.

16. The method of claim 1, further comprising a client connected to a first access node roaming to a second access node, the first access being at least one of a fixed access node or a mobile access node, the second access node being at least one of a fixed access node or a mobile access node, wherein the second access node allows the client to maintain a same default gateway IP address as the client roams from the first access node to the second access node.

17. The method of claim 16, further comprising the second access node detecting the client, wherein detecting the client comprises:
  detecting a MAC address of the client;
  determining an IP address of the client.

18. The method of claim 16, wherein detecting the client further comprises:
  receiving an association request from the client.

19. The method of claim 16, wherein detecting the client further comprises:
  determining client information parameters.

20. The method of claim 19, wherein determining client information parameters comprises at least one of determining an IP address of client's default gateway, determining a length of a DHCP lease, determining a time the client was last on the network, determining an IP address of the client.

21. The method of claim 1, wherein the first access node references at least one of: a first gateway within a same cluster as the first access node, and another gateway, to obtain client information regarding the client.

22. The method of claim 1, wherein the first access node obtains the client information from a gateway by sending an anti-ARP request.

23. The method-of claim 1, wherein if a first requested gateway does not have the client information, then the first requested gateway requests the client information from another gateway.

24. A method of an access node selecting a routing path through a mesh network that includes mobile access nodes, comprising:
  the access node of the mesh network receiving routing beacons from at least one upstream access node, the routing beacons including information of upstream access nodes along a path to a gateway access node, wherein the routing beacons originate at the gateway access node at a predetermined rate;
  the access node selecting a route through an upstream access node based upon;
    a) a quality of beacons received from at least one upstream access node, and
    b) whether the at least one upstream access node is a fixed access node or a mobile access node;
  wherein the quality of routing beacons is determined by a percentage of routing packets per unit of time transmitted from the upstream access node that are received from the upstream access node;
  further comprising each access node that receives routing beacons, modifying the routing beacons of a selected route by attaching an address of the access node, and re-broadcasting the modified routing beacons, wherein routing beacons include addresses of all access nodes included in a selected routing path to the originating gateway.

* * * * *